United States Patent [19]

Haupt

[11] 4,250,488
[45] Feb. 10, 1981

[54] DEVICE FOR SCANNING PATTERNS WITH A REGULATED LIGHT SOURCE

[75] Inventor: Gerhard Haupt, Konstanz, Fed. Rep. of Germany

[73] Assignee: Computer Gesellschaft Konstanz mbH, Fed. Rep. of Germany

[21] Appl. No.: 29,017

[22] Filed: Apr. 11, 1979

[30] Foreign Application Priority Data

Apr. 14, 1978 [DE] Fed. Rep. of Germany ....... 2816325

[51] Int. Cl.³ .............................................. G06K 9/40
[52] U.S. Cl. .......................... 340/146.3 AG; 235/455; 250/205; 250/567
[58] Field of Search ............. 340/146.3 AG; 235/455; 250/205, 567, 568

[56] References Cited

U.S. PATENT DOCUMENTS

| | | | |
|---|---|---|---|
| 3,089,123 | 5/1963 | Hennis et al. | 340/146.3 AG |
| 3,322,893 | 5/1967 | Townsend | 340/146.3 AG |
| 3,449,585 | 6/1969 | Trehub | 340/146.3 AG |
| 3,517,167 | 6/1970 | Bell | 235/455 |
| 3,582,661 | 6/1971 | Pijls | 250/205 |
| 3,651,252 | 3/1972 | Land et al. | 250/205 |
| 3,944,979 | 3/1976 | Kwok | 340/146.3 AG |
| 4,143,358 | 3/1979 | Neff | 340/146.3 SY |
| 4,177,449 | 12/1979 | Ikeda | 340/146.3 AG |

FOREIGN PATENT DOCUMENTS

1241404  8/1971  United Kingdom .......... 340/146.3 AG

*Primary Examiner*—Leo H. Boudreau
*Attorney, Agent, or Firm*—Hill, Van Santen, Steadman, Chiara & Simpson

[57] ABSTRACT

Patterns on a recording medium are scanned, with reflected light from a light source, and interference factors occurring from fluctuating diffused reflectance of the recording medium and the changing distance of the light source from the scanning field are overcome through the regulation of the light source in response to the light received by the scanner. With a control loop for the light source undesired information in the image signal is eliminated by regulating the illumination intensity. In the scanning device, a sensor converts the light reflected from the scanning field into a plurality of individual analog signals. A sum signal is formed from the individual signals and is provided, delayed, as a measurable variable and is compared with a predetermined reference value in a comparator. The output signal of the comparator controls a regulating unit in the electric circuit of the light source. Inasmuch as the aforementioned interference factors are particularly aggravating when different recording media are scanned and the recording media are not automatically transported during scanning, the device is of particular advantage when employed in manually-guided, hand-held reading devices.

8 Claims, 2 Drawing Figures

DEVICE FOR SCANNING PATTERNS WITH A REGULATED LIGHT SOURCE

BACKGROUND OF THE INVENTION

1. Field of the Invention

The invention relates to a device for scanning patterns with a light source which illuminates a scanning field on a recording medium, and in particular in which a sensor is formed of a plurality of photoelectric elements for converting the reflected light received from the scanning field, via a lens, into analog electric image signals, in which the light flux emitted by the light source is automatically readjusted for the compensation of interference factors.

2. Description of the Prior Art

Such scanning devices are employed in automatic character recognition systems in order to convert visually readable ciphers or letters of a recording medium, for example, of a document, of a letter or even of a label, directly into a form that can be evaluated by machine and to supply the characters for further processing to a data processing system.

A scanning device of the type generally mentioned above is known, for example, from the German allowed application No. 2,534,235. A photo diode line having a built-in sampling shift register is employed as the sensor surface. An analog-digital converter is connected to the sensor by way of an integrator, the output signals of which represent digitized image signals. These signals are subject to error by differences in the electron yield of the individual photo diodes, by differences in the light-sensitive surfaces of the diodes, by unevenness of the light and other systematic errors. The errors must therefore be eliminated before further processing of the image signals in a recognition device. In the known device, the white background of the read zone of a recording medium to be scanned is directly employed for the simulation of a calibration norm. This uniform surface is scanned for the preparation of correction values for the image signals. A correction value respectively allocated to a specific photo diode is calculated from the scanning signals thus generated and incorrectly deviating from one another by means of an individual comparison with a reference value. In the known arrangement, a gray scale value storage is additionally provided, which intermediately stores the scanned digitized image signals until a first calculation of the correction values is accomplished.

From the foregoing, the following picture is produced. The recording medium to be read must be illuminated in a character recognition device. The brightness respectively returned from the scanning field of the recording medium is imaged via an optic on a sensor surface which converts the brightness into electrical signals. The fluctuation of the returned brightness stems, on the one hand, from the characters on the recording medium and contains the desired information. On the other hand, however, it contains undesired information caused by interference factors which are caused by the aging of the illumination and by the changing diffused reflectance of the background and the like.

In hand-held reading devices which are manually guided over the recording medium, a further interference factor of significance must be taken into consideration, namely the changing distance of the recording medium from the light source. Here, one must assume that the operator is not in a position to continuously maintain nearly identical scanning conditions within a very narrow range of tolerance. On the other hand, in character recognition devices having automatic transport of the recording medium to be scanned, it is possible to eliminate this undesired information more or less by means of alignment techniques, since a rather precisely defined distance of the recording medium from the light source and, in general, only slight reflectance fluctuations of the recording medium can be presupposed for these types of application. The known corrections of the digitized image signals, however, are no longer sufficient in the case of hand-held reading devices.

Here, and in addition to such alignment methods, it is necessary to constantly adapt the intensity of the illumination of the scanning field on the recording medium to the changing scanning conditions. In this connection, an electro-optical control loop for regulating the intensity of the spot of light of a cathode ray tube is known from the German Pat. No. 1,917,006. Heretofore, cathode ray tubes were more often employed as flying-spot scanners because they allow a point of light, sharply focused on the screen of the cathode ray tube, to be easily deflected, at least in one direction. This point of light is imaged by means of a lens onto the scanning field with the recording medium as the picture plane. The reflected light is converted into electrical image signals with very sensitive photoelectric transducers, for example photo multipliers.

The flying-spot scanners find little use today. The cathode ray tube requires a large spatial volume, is only a very weak light source, and therefore requires very sensitive photoelectric elements whose varying sensitivity moreover falsify the scanning result given different light incidence angles of the light return from the scanning field.

In the known electro-optical control loop, the influences of the varying reflectivity of the individual recording medium is compensated, on the one hand and, on the other hand, separately from this, the modulation of the image signals to be traced to the varying angle of incidence of the reflected light is eliminated. A separate control loop is provided for this purpose. A second pair of photo multipliers which are not oriented toward the scanning field, but rather toward the screen of the cathode ray tube, are part of this control loop. The common output of this second pair of transducers is connected to a control circuit in which a signal for controlling the radiation intensity of the cathode ray tube is derived from the common transducer signal by means of comparison with a reference voltage in such a manner that the second pair of transducers emits a signal which is adapted to the reference voltage as much as possible.

Flying-spot scanners which exhibit additional photoelectric transducers in order to generate an adjustment magnitude in a control loop which serves to control the intensity of the point of light on the screen of the cathode ray tube in such a manner that varying angles of light incidence of the reflected light on the photoelectric transducers scanning the field of the recording medium are compensated are therefore to be presumed as known in character recognition devices which utilize automatic document transport.

The principle of the flying-spot scanner with its single deflected light beam requires a completely different scanning process than a scanning device of the type generally mentioned above. Moreover, the control loop known in this connection is also far too expensive in its basic construction for character recognition devices which are to be peripherally employed and be as cost-effective as possible. In the known installation, one has proceeded precisely from that consideration of duplicating the entire arrangement for the photo-electric conversion of the scanning signal in order to create a separate control loop.

SUMMARY OF THE INVENTION

Proceeding from the above considerations and the known state of the art, the object of the present invention is to provide a device of the type generally mentioned above with which it is possible to eliminate the undesired information in the scanning signal produced by the fluctuating reflectivity of the recording medium and by the changing distance of the recording medium from the light source by regulating the intensity of the illumination.

This object is achieved, in a device of the type generally mentioned above, by providing that the sensor sum the individual analog image signals and provide the same, through a time delay device, to a comparator circuit for comparison with a fixed reference voltage. The comparator circuit is connected with a control input of a regulating unit with which the lamp voltage of the light source can be adjusted as a function of the output signal of the comparator circuit.

This solution to the aforementioned problems has the great advantage that a very slight circuit expense is required for the derivation of the adjustment magnitude; thereby the circuit arrangement is in a position to unequivocably separate the desired character information from the interference factors to be compensated and to process only the latter in the control loop for the derivation of the adjustment magnitude.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
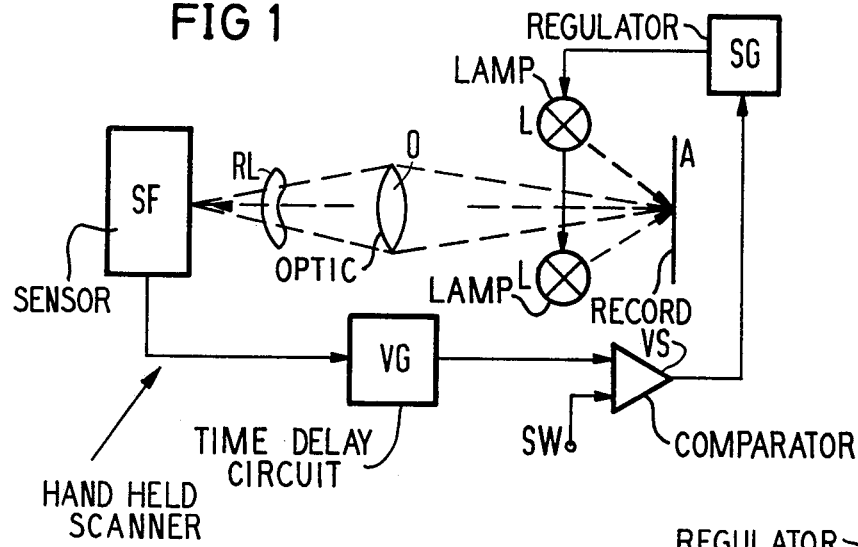
FIG. 1 is a block diagram of a device constructed in accordance with the present invention for scanning patterns and having a regulated light source which compensates for interference factors.

Referring first to FIG. 1, a recording medium A is schematically illustrated. In front of the recording medium A, two lamps L are arranged in a parallel plane in such a manner that they illuminate a limited scanning field on the recording medium A under an angle of about 45°. The light RL reflected from the recording medium is directed by way of a lens O, to strike a sensor surface SF, i.e. the scanning field is thus imaged on the sensor surface SF. The sensor comprises a plurality of photoelectric elements which can be arranged in a line or in the form of a matrix.

The brightness received by the sensor and converted into electric signals is supplied as a measurable value to a time delay device VG which serves for the separation of the rapidly changing desired character information from the undesired interference factors. The measurable variable formed in this manner is supplied to a comparator circuit VS and is there compared with a reference value SW. The output signal of the comparator VS then forms an adjustment magnitude which is supplied to a regulating unit SG which regulates the brightness of the lamps L via their operating voltage as a function of the controlling input magnitude. The control loop is closed via the optical path of the reflected light RL beamed from the lamps L onto the scanning field of the recording medium A and reflected therefrom to the sensor.

Figure 2:
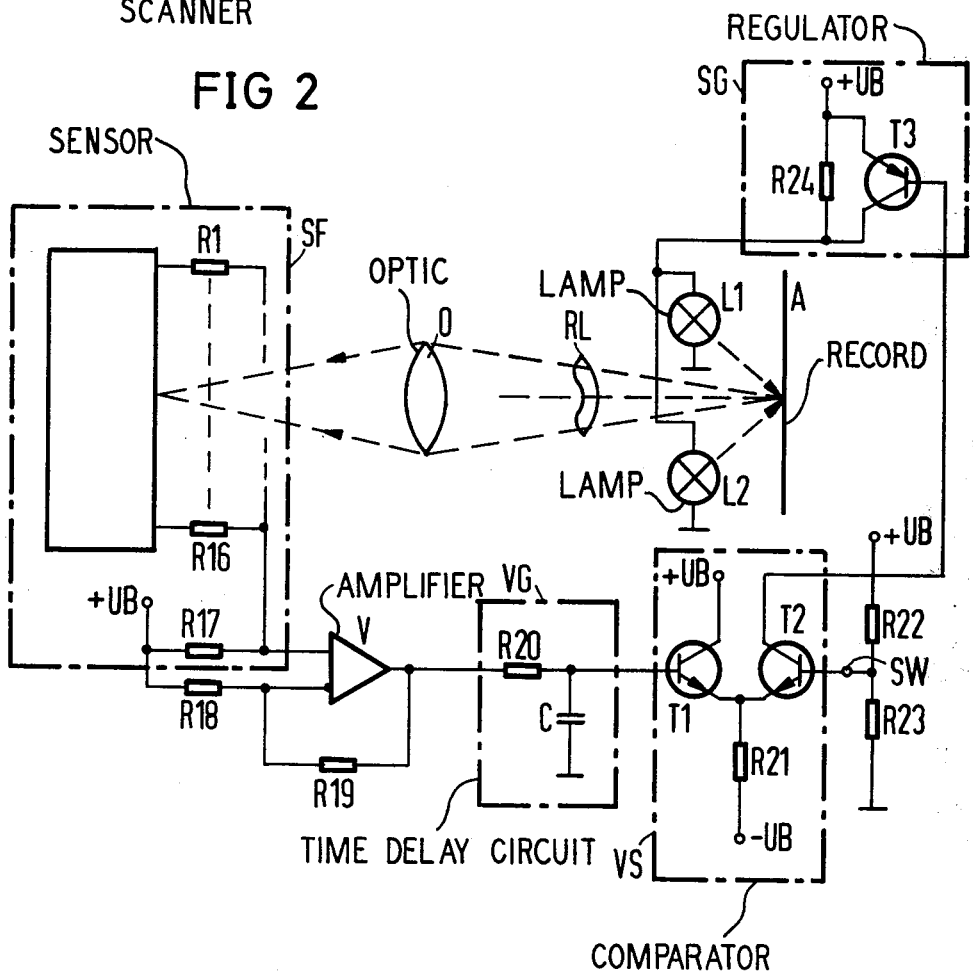
FIG. 2 is a detailed circuit diagram of the apparatus illustrated in FIG. 1.

FIG. 2 is a detailed circuit illustration of an arrangement for the control loop described, in principle, on the basis of FIG. 1. The locally incident reflected light RL is converted into proportional currents in the photo sensitive sensor SF, which currents flow from a positive voltage source +UB into the photoelectric transducer via load resistors R1–R16 respectively assigned to a photo sensitive element or to a plurality of photo sensitive elements. A further ohmic resistor R17 is connected between a common junction of the resistors R1–R16 and the positive voltage source +UB as a terminal resistance which is traversed by the sum of the photo currents. The voltage decrease at this terminal resistor R17 forms the measurable variable for the control loop.

A further ohmic resistor R18 is connected in common with the resistor R17 to the positive voltage source +UB. The resistors R17 and R18 are connected at their other ends to a respective input of an amplifier V which has a further ohmic resistor R19 connected as a feedback resistor between the output of the amplifier V and the input which is connected to the resistor R18. The measurable variable occurring as a voltage drop at the resistor R17 is amplified by the amplifier V in the ratio of the feedback resistor R19 to the input resistor R18. The measurable value amplified in this manner is supplied to the time delay device VG which is designed as a low-pass filter and which has a further ohmic resistor R20 in a series arm and a bypass capacitor C connected to ground in a shunt arm. The low-pass filter is dimensioned in such a manner that all high-frequency portions of the amplified measurable value are filtered out and only its low-frequency portions are to be allocated to and considered to represent interference factors which are to be further processed.

The filtered measurable variable is supplied to the comparator circuit VS. The comparator circuit VS is designed as a differential amplifier and comprises two transistors T1 and T2 whose emitters are connected to a negative voltage source −UB by way of a common emitter resistor R21. The first transistor T1 has its base connected to the output of the time delay device VG and has its collector connected to the positive voltage source +UB. The reference value SW is supplied to the base of the second transistor T2 as a comparison value. The reference value is generated with a permanently adjusted voltage divider which comprises two further ohmic resistors R22 and R23 which are connected in series between the positive voltage +UB and ground. The collector of the second transistor T2 forms the output of the comparator circuit VS and is connected to the regulator circuit SG.

The regulating circuit SG comprises a further transistor T3 whose base is connected to the output of the comparator circuit VS. A further ohmic resistor R24 is connected in parallel to the emitter-collector path of the transistor T3 and in series therewith between the positive voltage source +UB and the lamps L1 and L2 which are connected in parallel to each other between the resistor R24 and ground. The transistor T3 of the regulating unit SG is modulated according to the control signal supplied to its base and, therefore, the current supplied from the positive voltage source +UB for the lamps L1 and L2 is accordingly regulated.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A hand-held device to be manually guided over the surface of a recording medium for scanning patterns, comprising:
    a light source of illuminating a scanning field on the recording medium;
    a lens;
    sensor means including a plurality of photoelectric sensors for receiving light reflected from the scanning field via said lens and converting the reflected light into analog electric image signals, means for summing the analog electric image signals into a summation signal, a plurality of first resistors respectively connected in circuit with said photoelectric sensors, and a second resistor connecting each of said plurality of resistors in common to a voltage source, the voltage drop occurring across said second resistor constituting the summation signal;
    a time delay circuit connected to said sensor means for receiving and delaying the summation signal;
    a comparator connected to said time delay circuit for comparing the delayed summation signal with a reference value;
    a regulating circuit connected between said comparator and said light source for controlling the operation of the light source in accordance with the output of said comparator; and
    an amplifier including a first input, a second input and an output, said first input connected to the junction of said first and second resistors, a third resistor connected between said second input and the voltage source, and a fourth resistor connected as a feedback element between said output and said second input.

2. The device of claim 1, wherein said time delay circuit comprises:
    a low pass filter including a series arm and a shunt arm with a series resistor connected in said series arm between said sensor means and said comparator, and a bypass capacitor connected in said shunt arm.

3. The device of claim 1, wherein said comparator comprises:
    a differential amplifier including a pair of transistors each having an emitter, a base and a collector, a first resistor connecting said emitters to a first operating voltage, one of said bases connected to said time delay circuit and the other base connected to the reference voltage, the collector of the transistor having said one base connected to a second operating voltage, and the collector of the other transistor connected to said regulating circuit.

4. The device of claim 3, comprising:
    a voltage divider connected between the second operating voltage and ground and including a tap connected to said other base to provide said reference voltage.

5. The device of claim 1, wherein said regulating circuit comprises:
    a transistor including a base connected to said comparator, an emitter connected to an operating voltage, a collector connected to said light source and a resistor connected between said emitter and said collector.

6. A device for scanning patterns on a recording medium, comprising:
    a light source for illuminating a scanning field on the medium;
    a lens;
    sensor means including a plurality of photoelectric sensor circuits each including a first resistor, and summing means including a second resistor connecting each of said first resistors to a first voltage, said sensor means operable to produce individual analog image signals in said sensor circuits and a summation signal at the junction of said first and second resistors;
    an amplifier including a first input, a second input and a output, said first input connected to the junction of said first and second resistors;
    a third resistor connected between said second input and the voltage source;
    a fourth resistor connected as a feedback element between said output and said second input;
    a comparator;
    a time delay circuit connected to the output of said amplifier for receiving and delaying the summation signals, said time delay circuit comprising a low pass filter including a series arm and a shunt arm with a series fifth resistor connected in said series arm between said amplifier and said comparator, and a bypass capacitor connected in said shunt arm;
    said comparator comprising
    a differential amplifier including a pair of transistors each having an emitter, a base and a collector, a sixth resistor connecting said emitters to the first voltage, one of said bases connected to said resistor and said capacitor of said time delay circuit and the other base connected to a reference voltage, the collector of said transistor having said one base connected to a second operating voltage, and the collector of the other transistor connected to said regulating circuit; and
    a regulating circuit comprising
    a transistor including a base connected to said comparator, an emitter connected to an operating voltage, a collector connected to said light source and a seventh resistor connected between said emitter and said collector.

7. The device of claim 6, comprising:
    a voltage divider connected between the first operating voltage and ground and including a tap connected to said other base to provide said reference voltage.

8. The device of claim 6, constructed as a hand-held device to be manually guided over the surface of the recording medium.

* * * * *